US007329396B2

(12) United States Patent
Harris et al.

(10) Patent No.: US 7,329,396 B2
(45) Date of Patent: Feb. 12, 2008

(54) PROCESS FOR THE RECOVERY OF VALUE METALS FROM MATERIAL CONTAINING BASE METAL OXIDES

(75) Inventors: G. Bryn Harris, Montreal (CA); Vaikuntam I. Lakshmanan, Mississauga (CA); Ramamritham Sridhar, Mississauga (CA)

(73) Assignee: Jaguar Nickel Inc., Toronto, Ontario (CA)

( * ) Notice: Subject to any disclaimer, the term of this patent is extended or adjusted under 35 U.S.C. 154(b) by 225 days.

(21) Appl. No.: 10/844,315

(22) Filed: May 13, 2004

(65) Prior Publication Data

US 2004/0228783 A1    Nov. 18, 2004

Related U.S. Application Data

(60) Provisional application No. 60/470,871, filed on May 16, 2003, provisional application No. 60/496,921, filed on Aug. 22, 2003, provisional application No. 60/496,922, filed on Aug. 22, 2003.

(51) Int. Cl.
*C01G 51/04* (2006.01)
*C01G 49/02* (2006.01)
*C01F 5/10* (2006.01)

(52) U.S. Cl. ............... 423/140; 423/150.1; 423/150.6; 423/636

(58) Field of Classification Search ............ 423/150.1, 423/140, 151, 636, 150.6, 155
See application file for complete search history.

(56) References Cited

U.S. PATENT DOCUMENTS 2,036,664 A    4/1936 Wescott (Continued)

FOREIGN PATENT DOCUMENTS

GB    117870    8/1918

(Continued)

OTHER PUBLICATIONS

Chalkley, M.E. and Toirac, I.L, "The acid pressure leach process for nickel and cobalt laterite"., Hydrometallurgy and Refining of Nickel and Cobalt, Proceedings of the 27th Annual Hydrometallurgical Meeting of CIM, Montreal, Aug. 1997, p. 341 (I. Mihaylov and W.C. Cooper).

(Continued)

*Primary Examiner*—Wayne A. Langel
*Assistant Examiner*—James Fiorito
(74) *Attorney, Agent, or Firm*—Philip Mendes da Costa; Bereskin & Parr

(57) ABSTRACT

A process for leaching a value metal from oxidic materials, such as a lateritic nickel ore, comprising the step of leaching the ore with a lixiviant comprising a cationic salt (e.g., magnesium chloride) and hydrochloric acid is disclosed. An oxidant or additional metal chloride (such as that which results from the leaching operation) may be added. In one embodiment, the process comprises recovery of a value metal from ore comprising the steps of: leaching the ore with a lixiviant; separating a value metal-rich leachate from the ore in a first solid-liquid separation; oxidizing and neutralizing the value metal-rich leachate so obtained; and separating a solution of magnesium chloride from the leachate so obtained in a second solid-liquid separation. In another embodiment, the lixiviant solution is regenerated from the solution of magnesium chloride. In a further embodiment, regeneration of the lixiviant solution includes a step of producing magnesium oxide from the solution of magnesium chloride.

83 Claims, 2 Drawing Sheets

U.S. PATENT DOCUMENTS

| | | | |
|---|---|---|---|
| 2,105,456 A | | 1/1938 | William et al. |
| 3,232,750 A | | 2/1966 | Wesolowski et al. |
| 3,661,564 A | | 5/1972 | Gandon et al. |
| 3,770,868 A | * | 11/1973 | Swinkels et al. ............. 423/50 |
| 3,909,249 A | | 9/1975 | Coldrey et al. |
| 3,922,164 A | | 11/1975 | Reid et al. |
| 4,042,664 A | * | 8/1977 | Cardwell et al. ............. 423/24 |
| 4,062,924 A | | 12/1977 | Glaum et al. |
| 4,200,455 A | | 4/1980 | Bradbury et al. |
| 4,435,368 A | | 3/1984 | Demarthe et al. |
| 4,614,543 A | | 9/1986 | Duyvesteyn et al. |
| 4,944,928 A | | 7/1990 | Grill et al. |
| 5,089,412 A | * | 2/1992 | Hackl et al. ............. 435/252.4 |
| 5,091,161 A | | 2/1992 | Harris et al. |
| 5,120,514 A | | 6/1992 | Tveten et al. |
| 5,571,308 A | * | 11/1996 | Duyvesteyn et al. .......... 75/430 |
| 5,709,730 A | | 1/1998 | Cashman |
| 5,718,874 A | | 2/1998 | Moscony et al. |
| 6,042,794 A | | 3/2000 | Amundsen et al. |
| 6,261,527 B1 | | 7/2001 | Arroyo et al. |
| 6,395,242 B1 | | 5/2002 | Allen et al. |
| 6,428,599 B1 | | 8/2002 | Cashman |
| 6,692,710 B1 | | 2/2004 | Ballou |
| 6,863,873 B1 | * | 3/2005 | Hoboy et al. ................ 423/103 |
| 2002/0053260 A1 | | 5/2002 | Nakon |
| 2002/0152845 A1 | | 10/2002 | Flening et al. |

FOREIGN PATENT DOCUMENTS

| | | |
|---|---|---|
| GB | 227301 | 1/1925 |
| GB | 239720 | 9/1925 |
| GB | 1008196 | 10/1965 |
| GB | 1494397 | 12/1977 |
| GB | 1510676 | 5/1978 |
| GB | WO 02/08477 | 1/2002 |
| WO | WO99/39026 | 8/1999 |
| WO | WO01/23627 | 4/2001 |

OTHER PUBLICATIONS

V.H. Ness and N.L. Hayward "Nickel Laterite Processing: Second Generation Design Problems", SME Preprint 01-65, SME Annual Meeting, Denver, CO, Feb. 26-28, 2001.

Gibson, R.W. and Rice "A hydrochloric acid process for nickeliferous laterites", Nickel Colbalt 97, vol. 1, Hydrometallurgy and Refining of Nickel and Cobalt, Proceedings of the 27th Annual Hydrometallurgical Meeting of CIM, Montreal, Aug. 1997, p. 247 (I. Mihaylov and W.C. Cooper).

Caron, M.H., "Fundamental and practical factors in ammonia leaching of nickel and cobalt ores", J. Metals 67 (1950) Trans AIME 188 (1) p. 67.

Caron, M.H., "Separation of nickel and cobalt" J. Metals 67 (1950), Trans AIME 188 (1), p. 91.

* cited by examiner

PROCESS FOR THE RECOVERY OF VALUE METALS FROM MATERIAL CONTAINING BASE METAL OXIDES

FIELD OF THE INVENTION

The present invention relates to a method for the leaching of value metals from oxidic materials. In one particular aspect, the oxidic material is a lateritic nickel ore. Accordingly, the process may be used to recover nickel, and cobalt (if present) from both limonite and saprolite ores. The leaching process may also be operated to inhibit the leaching of magnesium or, alternately to leach a selected amount of magnesium.

BACKGROUND OF THE INVENTION

There has been a great deal of interest in the processing of lateritic nickel ores in the past few years, with the Western Australian projects, those of Minara Resources (formerly Anaconda Nickel) at Murrin Murrin, Preston Resources at Bulong, the Cawse plant (now owned by OMG), and BHP-Billiton's Ravensthorpe Project, together with Inco's Goro Project in New Caledonia, being principal examples.

All of the purely hydrometallurgical processes developed to date for the commercial processing of lateritic nickel ores have employed a sulfate medium, following on the original process developed and operated at Moa Bay in Cuba since 1959, as described by Chalkley and Toirac (Chalkley. M. E. and Toirac, I. L., "The acid leach process for nickel and cobalt laterite. Part 1: Review of operations at Moa" in Nickel Cobalt 97, Volume 1, Hydrometallurgy and Refining of Nickel and Cobalt, I. Mihaylov and W. C. Cooper, Editors, Proceedings of the 27th Annual Hydrometallurgy Meeting of CIM, CIM, Montreal, August 1997, p 341). These processes have attempted to optimize a pressure leach process in various ways, as described by Ness and Hayward (V. H. Ness and N. L. Hayward, Nickel Laterite Processing: Second Generation Design Problems, SME Preprint 01-65, SME Annual Meeting, Denver, Colo., Feb. 26-28, 2001). However, sulfuric acid is monoprotic at the temperatures employed (240-280° C.), and therefore twice the anticipated quantity of acid has to be added to effect leaching. When the pressure in the system is let down to atmospheric pressure for further processing, the acid returns to the biprotic form and thus a substantial amount of free acid has to be neutralized. Various schemes have been investigated to overcome this difficulty, including the method proposed by BHP Minerals International in U.S. Pat. No. 6,261,527, issued Jul. 17, 2001, in which a proportion of the saprolite ore is used to neutralize the excess acid. This approach is being followed by BHPBilliton at Ravensthorpe.

The advantages generally promoted for using a pressure acid leach in the sulfate system are common materials of construction, and effective and efficient control of iron. The system is, however, inefficient in dealing with a feed that has significant magnesium values, which is a characteristic of saprolitic lateritic nickel ores. A magnesium sulfate solution is obtained, which may be crystallized and then roasted in order to recover the sulfuric acid. However, this is an expensive process, requiring both a roaster and a sulfuric acid plant to convert sulfur dioxide gas generated in the roasting step back to sulfuric acid. Sulfate processes are discussed at length by Lalancette in PCT application WO 02/08477.

Chloride flowsheets have been proposed for the treatment of lateritic nickel ores, for example as described by Gibson and Rice (Gibson, R. W. and Rice, N. M., "A hydrochloric acid process for nickeliferous laterites" Nickel Cobalt 97, Volume 1, Hydrometallurgy and Refining of Nickel and Cobalt, I. Mihaylov and W. C. Cooper, Editors, Proceedings of the 27th Annual Hydrometallurgy Meeting of CIM, CIM, Montreal, August 1997, p 247). This paper discloses leaching in hydrochloric acid, wherein a large proportion of the iron is dissolved, and recovering the iron by solvent extraction and pyrohydrolysis, following teachings practiced in the steel pickling industry. The value and tonnage of the iron products in comparison to those of nickel renders the process economically unattractive. A variation of the process is proposed by Moscony et al. in U.S. Pat. No. 5,718,874, issued Feb. 17, 1998, wherein solvent extraction is employed to separate iron and nickel values.

Demarthe, et al., in U.S. Pat. No. 4,435,368, issued Mar. 6, 1984, proposed a process wherein a suspension of feed material is treated with chlorine gas to oxidize and solubilize all of the base metals present.

Gandon et al., in U.S. Pat. No. 3,661,564, issued May 9, 1972, disclose a method of roasting a laterite ore with hydrochloric acid, followed by leaching to solubilize the chlorides of nickel and cobalt.

Canadian Patents 1023560 and 1,013,576 disclose methods of recovering nickel and cobalt from lateritic nickel ores by selective reduction of the ore followed by HCl leaching and chlorine gas treatment respectively. These processes suffer from the draw back of having to carryout a selective reduction step prior to leaching, which is energy intensive.

A process for recovering non-ferrous metal values from a metal-containing sulphide material containing at least one of zinc, copper, lead, cobalt, nickel, silver and gold, as well as iron, is disclosed in U.S. Pat. No. 4,378,275 of Adamson et al., issued Mar. 29, 1983. The sulphide material is leached under oxidizing conditions with a relatively dilute acidic aqueous chloride lixiviant solution containing magnesium chloride. The oxidizing conditions which are disclosed use molecular oxygen in the form of air, oxygen-enriched air and pure oxygen. Although leaching at atmospheric pressure is stated to be possible, it is preferable to operate the leach stage under elevated partial pressures i.e. under pressure leach conditions. Use of elevated temperatures is preferred i.e. at least about 50° C. to about 250° C., with temperatures in the range of 100° C. to 180° C. being preferred. The period for leaching is from about 5 minutes to about 12 hours. The kinetics of the process indicate a need to use very long periods of leaching at the lower temperatures and atmospheric pressure, and present applicants have verified that this is so. Pressure leaching, using oxygen, of a Zn/Cu/Fe ore containing very low levels of nickel at 160° C. is exemplified. In the process, non-ferrous metal values are solubilized, leaving iron oxide and sulphur as a residue. The iron oxide is shown to be goethite, and this is known to require elevated temperatures (i.e. above the boiling point) to have reasonable (<4 hours) rates of formation. Goethite is also notoriously difficult to handle in the subsequent solid/liquid separation step. The leach liquor is subjected to liquid-liquid extraction using a hydrophobic extractant. The raffinate, containing magnesium chloride and any sulphates formed during the leach process, is subjected to pyrohydrolysis to yield hydrogen chloride and magnesium oxide. The sulphates are then removed by washing of the magnesium oxide formed, which counteracts most of the advantages of forming magnesium oxide by pyrohydrolysis.

Duyvesteyn et al. in U.S. Pat. No. 5,571,308, issued Nov. 5, 1996, disclose a heap leach process using hydrochloric acid for the recovery of nickel from Ni—Fe—Mg laterite ores having high magnesium contents, with iron being removed by pyrohydrolysis as $Fe_2O_3$. Lalancette, in the aforementioned PCT application WO 0208477, claims that recoveries from the Duyvesteyn process are poor for nickel and cobalt. Lalancette further argues that pyrohydrolysis of the iron-magnesium chloride solution of U.S. Pat. No. 5,571,308 would produce a mixture of hematite and magnesium oxychloride. Magnesium oxychloride, is insoluble and cannot be washed out of the hematite. Further, the process of U.S. Pat. No. 5,571,308 has many steps, and is an expensive way of processing iron associated with the nickel in lateritic ores.

In PCT application WO 02/08477, Lalancette discloses a method for recovering nickel and cobalt, as well as magnesia, hematite and chromium in a chloride system. The ore is leached in very strong gaseous hydrochloric acid, and two methods are then proposed for liquor treatment and metal recovery. In the leach process, Lalancette claims that over 85% of the iron and magnesium dissolve. Iron is recovered using a modified form of spray roasting at about 200° C., and the nickel/cobalt salts then washed out of the solids. This approach is energy intensive, requires several processing steps, and has inherent problems with maintaining a water balance.

Ammonia may be used as a lixiviant for laterite, as described by Caron (Caron, M. H. "Fundamental and practical factors in ammonia leaching of nickel and cobalt ores" J. Metals 67 (1950) Trans AIME 188(1) p 91) and used commercially by, for example, Queensland Nickel in Australia and Nquel Tocantins in Brazil. However, this process requires an initial reduction roasting step to reduce metal oxides to metallic form for leaching by ammonia, which is energy intensive and provides low recovery of cobalt. A further disadvantage of ammonia is that the effluent contains nitrogen which is not environmentally acceptable. In order to reduce the nitrogen level in the effluent to acceptable levels, steam stripping may be used. However, steam stripping is energy intensive.

In summary, none of the processes developed or proposed to date are able to economically and technically handle both iron and magnesium found in lateritic nickel ores, while maintaining high metal recoveries. Sulfate-based processes require low-magnesium feeds, do not recycle the acid, and operate at high temperatures (240-280° C.) and pressures. The ammonia-based process requires an expensive pre-roasting step, and furthermore suffers from limited cobalt recovery. Any magnesium dissolved in the process is also a problem and is costly to deal with.

There are no known operating chloride-based processes for the treatment of lateritic nickel ores. A number of processes have been proposed, but these either (i) require a pre-treatment step such as roasting to render the iron relatively inert, or (ii) incur a very high dissolution of iron and consequently an expensive step to handle the dissolved iron. High levels of magnesium extraction, simultaneously with that of iron, are also produced, resulting in high acid consumption and downstream processing constraints due to the high levels of magnesium in solution.

SUMMARY OF THE INVENTION

In accordance with the present invention, lateritic nickel ores are treated with a lixiviant to obtain a leachate that contains solubilized base metals present in the lateritic nickel ore, such as nickel, cobalt, manganese, copper, aluminum, zinc and chromium and a solid residue that contains iron. The leach is conducted under conditions at which at least some, and preferably all or essentially all, of the iron that is leached from the ore is hydrolyzed and precipitated as hematite and/or magnetic iron oxide and not geothite. The resultant leachate may contain only residual amounts of iron, for example, the leachate may contain less that 10 g/L, more preferably less than 1 g/L and most preferably less than 1 mg/L iron. The leached ore may contain small amounts of iron that is not leached (for example less than 5, preferably less than 1 and most preferably less than 0.1 weight % of the iron originally present in the ore). Therefore, the leach may be conducted to isolate, or at least essentially isolate, iron from the remaining base metals in the leachate. Accordingly, one advantage of the present process is that, in essentially a single processing step, base metals are leached from lateritic nickel ores and a first level of separation is conducted due to the formation of hematite and/or magnetic iron oxide. By controlling the leaching conditions as taught herein, the resultant leachate may have a selected iron content. Preferably, the iron content is selected so as to facilitate the downstream recovery of the metal values in the leachate and the leaching conditions are adjusted to produce the selected iron content.

The hematite and/or magnetic iron oxide such as spinel produced by this step may be separated by any means known in the art, such as by magnetic separation or by vacuum filtration. Accordingly, a further advantage of the present invention is that a solid residue having a high iron concentration may be produced and subsequently treated to recover iron by process steps known in the art.

In accordance with another aspect of the present invention, the leaching of the lateritic nickel ore is conducted to control the amount of magnesium that is leached from the ore. For example, the leach may be conducted under conditions at which none or essentially none, of the magnesium in the ore is leached. Alternately, the process may be designed to produce magnesium as a product. In such a case, the magnesium in the ore may be used as a source of cations used to prepare the lixiviant. The spent lixiviant may be treated to recover magnesium leached from the ore as, e.g., magnesium oxide. Accordingly, another advantage of the instant invention is that magnesium is present in the lixiviant in a form that is readily recoverable if desired.

Another advantage of the present invention is that the base metals which are solubilized in the lixiviant may be sequentially recovered, such as by a series of precipitation, solvent extraction, ion exchange, pyrohydrolysis and/or electrowinning steps so as to produce a product stream containing a high concentration of nickel and a product stream containing a high concentration of cobalt. Accordingly, the product streams may be processed to obtain commercial grades of nickel and cobalt as well as other base metals.

Another advantage of the instant invention is that the lixiviant may be readily regenerated. In a preferred embodiment, the lixiviant utilizes magnesium chloride and hydrochloric acid. After the value metals have been recovered from the lixiviant, some or all of the lixiviant may be recycled to the leaching step with no or minimal treatment. Further, the acid may be regenerated in a pyrohydrolysis step, which also produces relatively pure magnesium oxide as a product.

A further advantage of the present invention is that the process may treat mixtures of low iron saprolytes and high iron limonites and obtain good nickel recoveries. Saprolytes and limonites occur commonly together in lateritic nickel ores deposits, such as those in Guatemala, A mixture of these ores cannot be treated economically by present technologies.

Low iron content lateritic nickel ores are typically treated by a pyrometallugical smelting process, which is energy intensive, while high iron content lateritic nickel ores in such deposits are discarded or stockpiled.

In accordance with one embodiment of the present invention, there is provided a process for treating a material containing at least one base metal oxide in which the material is leached with a lixiviant comprising hydrochloric acid and at least one chloride salt containing cations having a higher hydration number than hydrogen to produce a leachate, the concentration of chloride ions is above about 4.5 moles of total chloride/liter of lixiviant and the molar ratio of cations having a higher hydration number than hydrogen to the amount of hydrochloric acid in the lixiviant is from about 0.15 to about 4.5.

In one embodiment, the cation is selected from the group consisting of alkali metals, alkaline earth metals, ferric iron, ferrous iron, cuprous copper, cupric copper and mixtures thereof.

In another embodiment, the cation is selected from the group consisting of sodium, calcium, potassium, lithium, magnesium, ferric iron, ferrous iron, cuprous copper, cupric copper and mixtures thereof.

In another embodiment, prior to contacting the material, the cation consists essentially of magnesium. For example, the cation in the recycled lixiviant which is fed to the reactor consists essentially of magnesium.

In another embodiment, at the end of the leaching step, at least 25 weight % of the cation is magnesium. Preferably up to 75 weight percent may be of the cation may be magnesium at the end of the leaching step. The remaining cation may result from metals which are leached from the material during the leaching operation.

In another embodiment, the concentration of chloride ions is from 4.5 to 14M, and, preferably, from 6 to 12M.

In another embodiment, the molar ratio of cations in the lixiviant to the amount of HCl in the lixiviant is from about 0.3 to about 2.5.

In another embodiment, the material comprises more than 25 weight percent iron and the molar ratio of cations in the lixiviant to the amount of HCl in the lixiviant is from about 0.15 to about 3.

In another embodiment, the material comprises more than 25 weight percent iron and the molar ratio of cations in the lixiviant to the amount of HCl in the lixiviant is from about 1 to about 2.3.

In another embodiment, the material comprises less than 25 weight percent iron and the molar ratio of cations in the lixiviant to the amount of HCl in the lixiviant is from about 0.3 to about 2.

In another embodiment, the material comprises less than 25 weight percent iron and the molar ratio of cations in the lixiviant to the amount of HCl in the lixiviant is from about 0.15 to about 2.3.

In another embodiment, the material comprises an oxidic base metal ore and, preferably, a lateritic nickel ore.

In another embodiment, the leach is carried out at a temperature in the range of from about 75° C. to the boiling point of the lixiviant, and preferably, from about 100° C. to the boiling point of the lixiviant.

In another embodiment, the process is conducted in an unpressurized vessel.

In another embodiment, the Eh is sufficiently low to maintain base metals in the lixiviant in a divalent state and sufficiently high to maintain iron as ferric iron.

In another embodiment, the Eh is in the range of 300 to 700 mV and, preferably, in the range of 350 to 600 mV.

In another embodiment, the pH of the lixiviant is up to about 3 during the leaching step, and the pH of the lixiviant is raised to the range 0.4-2.5 to precipitate iron, as measured by conventional instrumentation.

In another embodiment, the pH of the lixiviant is up to about 2 during the leaching step, and the pH of the lixiviant is raised to the range 0.7-2.5 to precipitate iron, as measured by conventional instrumentation.

In another embodiment, the leachate has solublized therein a first metal comprising at least one of, copper, aluminum, zinc and chromium and a second metal comprising at least one of nickel and cobalt and the process further comprises:

(a) separating a value metal-rich leachate from the material in a first solids/liquid separation;
(b) increasing the pH of the leachate to obtain a solid fraction containing at least a portion of the first metal and a first metal-depleted leachate, and separating the solid fraction from the first metal-depleted leachate in a second solids/liquid separation step;
(c) further increasing the pH of the first metal-depleted leachate to obtain a second metal depleted leachate and a solid fraction containing the second metal as a precipitated hydroxide, and separating the solid fraction containing the second metal from the second metal-depleted leachate in a third solids/liquid separation step.

In another embodiment, the leachate also has solublized therein at least one of iron and manganese and step (b) further comprises subjecting the value metal-rich leachate to oxidation.

In another embodiment, the leachate also has solublized therein iron and step (b) further comprises treating the value metal-rich leachate to convert ferrous iron to ferric iron.

In another embodiment, the leachate also has solublized therein manganese and step (b) further comprises treating the value metal-rich leachate such that the manganese is in its tetravalent state.

In another embodiment, the cation comprises magnesium and the second metal-depleted leachate is subjected to recycle steps for recovery of magnesium chloride and hydrochloric acid.

In another embodiment, prior to contacting the material, the cation is magnesium and the second metal-depleted leachate is treated to produce a solution comprising magnesium chloride and hydrochloric acid that is used as the lixiviant.

In another embodiment, the regeneration step also produces magnesium oxide.

In another embodiment, at least some of the magnesium oxide is used as a pH adjustment agent in at least one of steps (b) and (c).

In another embodiment, the regeneration step includes partial evaporation and hydrolysis.

In another embodiment, the lixiviant comprises hydrochloric acid, magnesium chloride and at least one of (i) at least one additional metal chloride which is added to the lixiviant prior to the lixiviant contacting the material; (ii) at least one additional cation which is leached from the material and (iii) an oxidant. The lixiviant may comprise additional metal chloride or an additional cation, an oxidant or both. The additional metal chloride may be at least one of sodium chloride, potassium chloride, calcium chloride, copper chloride and iron chloride. The amount of additional metal chloride and cation may be 1-25 wt. % of the amount of magnesium chloride. The oxidant may be at least one of air, oxygen, chlorine, hypochlorite, chlorite, chlorate, perchlorate, permanganate and peroxide.

In another embodiment, at least a portion of one of the first metal-depleted leachate and the second metal-depleted leachate is treated to regenerate the lixiviant by admixing a magnesium chloride solution with gaseous hydrogen chloride.

In another embodiment, the portion of one of the first metal-depleted leachate and the second metal-depleted leachate is subjected to distillation for separation of azeotropic hydrochloric acid.

In another embodiment, the gaseous hydrogen chloride is admixed with the portion of one of the first metal-depleted leachate and the second metal-depleted leachate to increase the amount of hydrochloric acid separated as azeotropic hydrochloric acid.

In accordance with another embodiment of the present invention, there is provided a process for treating a material containing at least one base metal oxide comprising exposing the material to a lixiviant to produce a leachate, the lixiviant comprising hydrochloric acid and at least one chloride salt containing cations having a higher hydration number than hydrogen, the concentration of chloride ions and cations in the lixiviant is selected to leach ferric iron from the material and to hydrolyze leached iron to hematite and/or a magnetic iron oxide towards the end of the leach by increasing the pH.

In one embodiment, the leachate contains residual amounts of iron chloride.

In another embodiment, the cation comprises magnesium and the process further comprises adjusting the concentration of magnesium in the lixiviant to control the amount of magnesium leached from the material.

In another embodiment, the cation comprises magnesium and the process further comprises adjusting the concentration of magnesium in the lixiviant that is contacted with the material so as to minimize magnesium being leached from the material.

In another embodiment, the concentration of cations having a higher hydration number than hydrogen is selected to reduce the activity of water in the lixiviant.

In another embodiment, the material is a lateritic nickel ore.

In another embodiment, prior to contacting the material, the lixiviant consists essentially of magnesium chloride and hydrochloric acid.

In accordance with another embodiment of the present invention, there is provided a process for treating a material containing at least one base metal oxide comprising exposing the material to a lixiviant to produce a leachate, the lixiviant comprising hydrochloric acid and at least one chloride salt containing cations having a higher hydration number than hydrogen, and adjusting the Eh of the lixiviant at the end of the leaching step such that the Eh is sufficiently low to maintain base metals in the lixiviant in a divalent state and the Eh, pH and temperature are sufficiently high and the amount of free water is sufficiently low to precipitate iron as hematite and/or a magnetic iron oxide form.

In one embodiment, the Eh is sufficiently high such that iron chloride that forms during the leach is precipitated as hematite and/or magnetic iron oxide by appropriately adjusting the pH during leaching.

In another embodiment, the Eh is maintained in the range generally throughout the leaching step. The Eh may be in the range of 300 to 700 mV and, preferably, in the range of 350 to 600 mV.

In another embodiment, prior to exposing the lixiviant to the material, the cation is magnesium and the process further comprises adjusting the concentration of magnesium in the lixiviant that is contacted with the material so as to essentially prevent magnesium being leached from the material.

In another embodiment, the concentration of cations having a higher hydration number than hydrogen is selected to reduce the activity of water in the lixiviant.

In another embodiment, the material is a lateritic nickel ore.

In another embodiment, prior to exposing the lixiviant to the material, the lixiviant consists essentially of magnesium chloride and hydrochloric acid.

In accordance with another embodiment of the instant invention, there is provided a process for leaching a value metal from a lateritic nickel ore containing a first metal comprising at least one of copper, iron, manganese, aluminum, zinc and chromium and a second metal comprising at least one of nickel and cobalt, the process comprising:
(a) contacting the ore with a lixiviant comprising magnesium chloride and hydrochloric acid to produce a value metal-rich leachate and a leaching residue;
(b) separating the value metal-rich leachate from the leaching residue;
(c) increasing the pH of the leachate to obtain a first metal-rich solid fraction and a second metal-rich leachate and separating the first metal-rich solid fraction from the second metal-rich leachate;
(d) increasing the pH of the second metal-rich leachate to obtain a second metal-poor leachate and a second metal-rich solid fraction containing the second metal.

In another embodiment, the process further comprises adjusting the pH of the value-metal rich leachate to precipitate iron as hematite and/or a magnetic iron oxide and removing the precipitate prior to step (c).

In another embodiment, the leachate also has solublized therein at least one of iron and manganese and step (c) further comprises subjecting the value metal-rich leachate to oxidation.

In another embodiment, the leachate also has solublized therein iron and step (c) further comprises treating the value metal-rich leachate to convert ferrous iron to ferric iron.

In another embodiment, the leachate also has solublized therein manganese and step (c) further comprises treating the value metal-rich leachate such that the manganese is in its tetravalent state.

In another embodiment, the cation comprises magnesium and the second metal-poor leachate is subjected to recycle steps for recovery of magnesium oxide and hydrochloric acid.

In another embodiment, prior to contacting the material, the cation is magnesium and the second metal-poor leachate is treated to produce a solution comprising magnesium chloride and hydrochloric acid that is used as the lixiviant.

In another embodiment, magnesium oxide is produced during the rejuvenation of the lixiviant. Preferably, at least some of this magnesium oxide is used as a pH adjustment agent in at least one of steps (c) and (d).

In another embodiment, the lixiviant further comprises at least one of (i) at least one additional metal chloride which is added to the lixiviant prior to the lixiviant contacting the material; (ii) at least one additional cation which is leached from the material and (iii) an oxidant.

In any of these embodiments, the material or ore may be exposed to the lixiviant without being subjected to a roasting step.

In any of these embodiments, the material or ore may be obtained from limonite and saprolite horizons.

It will be appreciated by those skilled in the art that the process set out herein may be used on any material containing at least one base metal oxide. For example, the material to be treated may be a by product of metal processing operations such as flue dust, baghouse dust, intermediate products produced during the treatments of ores, such as slags, calcines, dross and anode slimes. Preferably, the material to be treated is a nickel oxide ore, a cobalt oxide ore, a zinc oxide material and/or a copper oxide ore. Most preferably, the material to be treated is a lateritic nickel ore.

BRIEF DESCRIPTION OF THE DRAWINGS

These and other advantages of the instant invention will be more fully and clearly understood in conjunction with the following description of the preferred embodiments of the invention shown in the drawings, in which.

DETAILED DESCRIPTION OF THE INVENTION

The preferred embodiments of the present invention are described as they may apply to a process for leaching of a value metal from a lateritic nickel ore as well as the recovery of the lixiviant solution.

A lateritic nickel ore is a nickeliferous ore that is commonly found in sub-tropical regions. As used herein, a lateritic nickel ore comprises principally nickel, iron, magnesium and silica. The ore may also contain, for example, one or more of cobalt, manganese, zinc, copper, chromium and aluminum. In embodiments of the present invention, the value metals may be nickel and magnesium, or nickel and cobalt, or other metals of value in the lateritic nickel ore, including nickel, iron, magnesium and/or silicon. Lateritic nickel ores, for example those from Guatemala, are hosted by ultramafic rocks, mainly dunites and pyroxenites, and are usually strongly serpentinized. Other lateritic nickel ores as defined herein may also be referred to as olivines. Such ores tend to be in the form of low magnesium high iron content limonite horizons, which typically contain 0.8-1.5% Ni, and higher nickel content (generally >2% Ni) saprolite horizons, which have a much higher magnesium content and lower iron content. Projects to recover nickel and cobalt from these ores have used both hydrometallurgical and pyrometallurgical approaches, with the former tending to focus on the low magnesium limonite horizons and the latter on the saprolite horizons. Very few projects have concentrated on treating both horizons, since the lower nickel content material is uneconomic for smelting processes, and the hydrometallurgical processes have been unable to deal with significant values of magnesium.

The process of the present invention is able to treat both limonite and saprolite horizons discussed above. Therefore, the feed material for the process of the present invention may be any lateritic nickel ore and may be ore from a low-magnesium limonite horizon and/or ore from a saprolite horizon. In particular, the feed material may contain ore from both limonite and saprolite horizons. Therefore in a preferred embodiment of the invention it is not necessary to discriminate between the various profiles present in a typical lateritic nickel ore body. Accordingly, an advantage of the present invention is that the feed material need not be sorted prior to being fed to the process.

Figure 1:
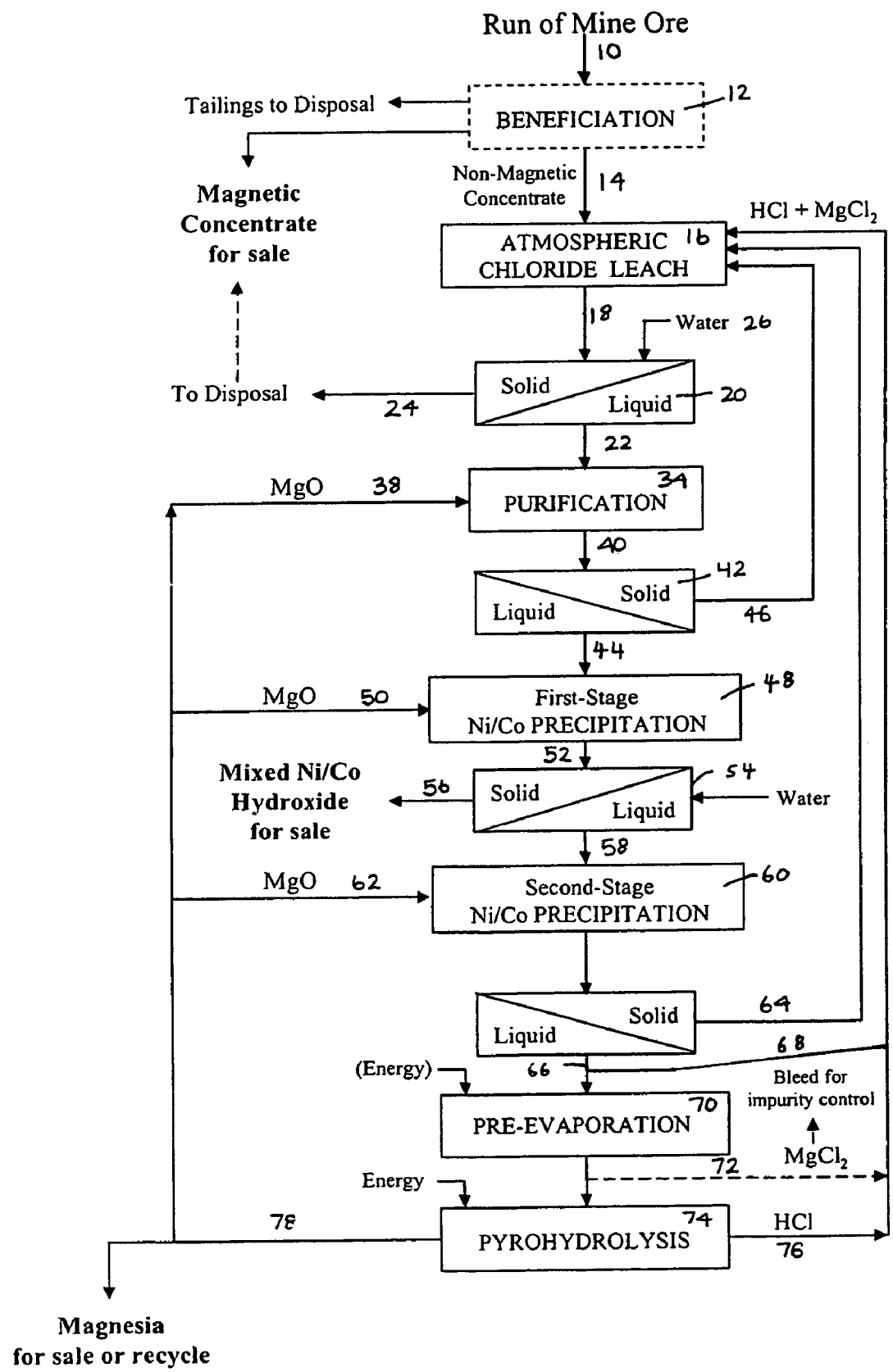
FIG. 1 shows a flowsheet for the recovery of value metals from lateritic nickel ore; and, FIG. 2 shows a flowsheet from an example of a countercurrent leach process, described in Example II.

The process of the present invention may be operated without pre-treatment of the lateritic nickel ore that changes the valence state of any of the metals. In particular, the process may be operated without roasting of the ore prior to the ore being leached. An optional pre-treatment step comprises subjecting the nickel and the cobalt in the ore to selective reduction. The ore may be subjected to physical processing steps known in the art to prepare the ore for leaching. For example, the ore may be subjected to grinding or beneficiation prior to leaching. Such steps are advantageous as they may reduce the residence time in the leaching step, reduce the volume of leach residue, and increase plant throughput. In particular embodiments of the invention, the ore is in the form of a concentrate. As shown in FIG. 1, ore 10 is provided to optional beneficiation step 12 to produce a concentrate 14.

Referring to FIG. 1, concentrate 14 is fed to a leaching step 16 in which the ore is contacted and leached with a lixiviant to produce a leachate slurry 18 which contains a solid residue. The lixiviant comprises hydrochloric acid and at least one chloride salt containing cations having a higher hydration number than hydrogen. The concentration of chloride ions and cations in the lixiviant is selected to leach iron from the concentrate and to hydrolyze leached iron during the leach to ferric oxide which precipitates out of solution to form part of the residue in leachate slurry 18. It will be appreciated that the residue will also comprise the portion of concentrate 14 that is not leached.

The cation that is present in the lixiviant, which is introduced to the ore during the leaching step, comprises magnesium and preferably, consists essentially of magnesium. It will be appreciated that as the ore is leached, cationic chloride salts may be formed in the lixiviant as a result of minerals that are leached from the ore. In accordance with one embodiment of this invention, the cation comprises magnesium chloride and up to about 25 weight percent of other cations that may be selected from the group consisting of alkali metals, alkaline earth metals, ferric iron, ferrous iron, cuprous copper, cupric copper and mixtures thereof. Preferably, the other cation is selected from the group consisting of sodium, calcium, ferric iron, ferrous iron, cuprous copper, cupric copper and mixtures thereof. Preferably, the additional cations are leached from the ore.

Iron, which is largely present as goethite in lateritic nickel ores, is leached according to the following reaction:

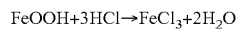
$$FeOOH + 3HCl \rightarrow FeCl_3 + 2H_2O$$

During leaching of the goethite, nickel and cobalt, which are largely bound within this matrix, are also released and become amenable to leaching as follows:

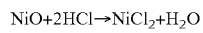
$$NiO + 2HCl \rightarrow NiCl_2 + H_2O$$

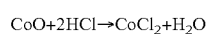
$$CoO + 2HCl \rightarrow CoCl_2 + H_2O$$

As represented by these equations, the higher the concentration of chloride and hydrogen ions in the lixiviant, the greater the force driving the leaching process to produce metal chlorides.

Without being limited by theory, it is believed that the high chloride ion content, together with the very low activity of water favours the hydrolysis of ferric chloride during the leaching process to form hematite and/or a magnetic iron oxide, which is readily settlable and filterable. Accordingly, while iron may be leached from the ore, the iron is precipitated out of solution so that a leachate is obtained which is not highly contaminated with iron. Accordingly, downstream recovery steps may be selected which are designed for leachates having little or no iron. In addition, the use of concentrated chloride salt solutions (brines) results in the water in the lixiviant having an activity that is substantially less than 1. Further, the use of high concentrations of cations that have a higher hydration number than the hydrogen ion, $H^+$ (or $H_3O^+$) results in the cation instead of the hydrogen ion preferentially interacting with the water in the lixiviant. Accordingly, the lixiviant may contain a small amount of free water. The free water is available to solubilize the metal chloride salts produced by the leaching process. Preferably, the amount of free water is selected so that the amount is sufficient to solubilize the metal chlorides without a substantial excess being available. This results in the hydrogen ion, $H^+$ (or $H_3O^+$) having significantly increased activity. Accordingly, in concentrated brines, such as magnesium chloride, a small amount of acid should be able to effect much more leaching activity than a similar amount in more dilute chloride solutions or in sulfate systems.

According to this theory, the reduced activity of water offers the opportunity to readily hydrolyze iron that enters solution, and at a significantly lower apparent pH than can be achieved in sulfate systems. Further, the iron is preferentially hydrolyzed over the other base metals. Accordingly, provided that the overall chloride concentration is maintained such that chloroferric anions (e.g. $FeCl_4^-$) do not form to any extent, in which case hydrolysis would be very difficult, then nickel and cobalt may be leached from the lateritic nickel ore and remain solubilized as a metal chloride (i.e. without being hydrolyzed and precipitated out of solution) with minimal solubilized iron in the leachate 22 at the end of the leaching step. Accordingly, the leaching step will remove iron from the ore and precipitate hematite and/or a magnetic iron oxide such as spinel, which may subsequently be recovered by, e.g., filtration and/or magnetic separation.

Preferably, the concentration of chloride ions is above 4.5M, more preferably from 4.5 to 14M and, most preferably, from 6 to 12M. In a particularly preferred embodiment, the concentration of chloride ions is at about the saturation level. In addition, it is also preferred that the molar ratio of cations in the lixiviant to the amount of HCl in the lixiviant is from about 0.15 to about 4.5 and preferably from about 0.3 to about 2.5.

Lateritic nickel ores may have an iron content from about 10 to about 45 weight percent. High iron content lateritic nickel ores have an iron content greater than about 25 weight percent (e.g., 25-45 weight percent) and low iron content lateritic nickel ores have an iron content less than 25 weight percent (e.g., 10-25 weight percent). In order to leach the base metals from high iron content lateritic nickel ores, a higher amount of acid is required. Accordingly, if the lateritic nickel ore is a high iron content ore, a more aggressive leach may be required and, accordingly, the molar ratio of cations in the lixiviant to the amount of HCl in the lixiviant is preferably from about 0.15 to about 3 and more preferably from about 1 to about 2.3. If the lateritic nickel ore is a low iron content ore, then a less aggressive leach is required and the molar ratio of cations in the lixiviant to the amount of HCl in the lixiviant is preferably from about 0.15 to about 2.3 and more preferably from about 0.3 to about 2.

As used herein, the molar ratio of cations in the lixiviant to the amount of HCl in the lixiviant is determined based on the amount of cations present in the lixiviant at the end of the leaching step (i.e. the amount of cations in the leachate 22) and the amount of acid which is present in the lixiviant when the lixiviant is introduced to the concentrate 14 and any additional amounts of acid which may be added to the lixiviant during the leaching step. It will be appreciated that all of the required acid may be added at the beginning of the leaching operation (i.e. it may be the lixiviant fed to the leaching reactor) or some or all may be added as the leach proceeds. As the leach proceeds, some of the chloride is used to form metal chlorides. Therefore, preferably, the acid is added on an on-demand basis—i.e. the leaching operation may be monitored and acid may be added to the lixiviant based on the amount of chloride consumed by the leaching of the base metals. Accordingly, the concentration of chloride ions may be maintained relatively constant. It will be appreciated that amounts of chloride salt may be added to the lixiviant as the leach proceeds to supply additional chloride ions provided that it is desired to increase the amount of cations in the lixiviant.

Preferably, the lixiviant, which is fed to the leaching step, comprises magnesium chloride and hydrochloric acid, and preferably consists essentially of magnesium chloride and hydrochloric acid. If the lixiviant comprises hydrochloric acid and magnesium chloride, then the leaching step is preferably carried out with a chloride concentration of at least 200 g/L, preferably 200-500 g/L and more preferably 200-400 g/L. The Mg/HCl (magnesium to hydrochloric acid) ratio expressed in terms of mass percentage (m/m) in the leach is preferably adjusted to optimize the leach, based on, for example, the particular ore being leached and the temperature at which the leaching is conducted. The Mg/HCl ratio may be in the range of 0.1-3.0, preferably 0.2-1.5 and more preferably 0.4-1.0 (i.e. grams of Mg in the leachate at the end of the leaching step to the concentration of acid in the lixiviant).

The hydrolysis and precipitation of iron takes place as follows:

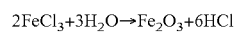

Accordingly, an advantage of this process is that the formation of hematite simultaneously releases acid consumed during the leaching of the iron. The liberated acid is then able to take part in further leaching reactions.

By using high strength magnesium chloride solutions, the high concentration of magnesium in the lixiviant mitigates against magnesium being dissolved during leaching. In particular, if the magnesium level is at the saturation level in the lixiviant when the lixiviant is introduced to the ore, then the lixiviant will not leach any magnesium from the ore. Similarly, if it is desired to produce a magnesium product, for example magnesium oxide, then magnesium may be recovered from the leachate. Thus the lixiviant when introduced to the ore will have a magnesium concentration less than the saturation level resulting in the lixiviant leaching magnesium from the ore. Accordingly, another advantage of the instant invention is that the amount of magnesium, if any, which is leached from the ore may be controlled. Similarly, if the lixiviant has a saturation amount of other cations as disclosed herein, then the lixiviant will be inhibited from leaching magnesium.

The leaching may be conducted as a continuous or a batch process. If the leaching is conducted on a continuous process, then the leaching may be conducted co-currently, counter-currently, or in another manner. If the ore is a high iron content ore, then the leaching is preferably conducted counter-currently.

The leaching may be conducted in a pressurized vessel or in an unpressurized vessel. Preferably, the leaching is conducted in an unpressurized vessel. An advantage of the instant invention is that the leaching step may be conducted in an unpressurized vessel thus permitting the leach to be conducted on as a continuous flow operation and at lower capital cost. The leaching may also be conducted in a pachuca or as a heap leach.

The leach is preferably carried out at a temperature in the range of 75° C. up to the boiling point of the leach solution, preferably about 100° C. to the boiling point of the solution. At ambient pressure the boiling point of the lixiviant is about 110° C. However, it will be appreciated that the boiling point is higher at elevated pressures. It has been determined that if the leach is conducted at a temperature above about 100° C., then the iron oxide precipitate has a physical structure which results in the iron more quickly settling out of solution thus simplifying the subsequent liquid/solid separation step.

The pH of the lixiviant solution, as measured by conventional equipment, during the leaching operation may be up to 3 and preferably up to 2. In order to precipitate iron which is leached during the process as hematite and/or magnetic iron oxide such as spinel, the pH of the leachate is preferably raised to 0.4-2.5 and, more preferably 0.7-2.5. The kinetics of the leaching step are enhanced at the lower pH range e.g., less than about 0.5 and preferably less than 0. However, a pH greater than about 0.4 is required to precipitate the iron as hematite and/or magnetic iron oxide such as spinel. Accordingly, in a preferred embodiment, the leaching is conducted at a lower pH and the pH of the leachate is then raised to precipitate iron oxide. It will be appreciated that some leaching may still occur as the pH is raised to precipitate the iron oxide. The precipitated iron oxide and the unleached ore are then subjected to solid/liquid separation to produce a leachate that is low in iron. The precipitated iron and unleached ore may be separated in a single solid/liquid separation step. However, it will be appreciated that the unleached ore may be separated in a first solid/liquid separation step and the pH then rasied to precipitate iron which may then be separated in a second solid/liquid separation step. It will be appreciated that conventional pH probes are designed to measure systems in which the activity of water is about 1. The water in the lixiviant herein has an activity appreciably less than 1. Accordingly, the pH numbers referred to herein are based on the use of conventional pH probes designed for systems in which the activity of water is about 1 and therefore, the actual pH of the lixiviant is not accurately measured. However, it has been determined that the use of conventional pH probes may be used to monitor the leaching process using the ranges set out herein.

The Eh (electric potential versus SHE (standard hydrogen electrode)) is preferably in the range 300-700 mV and, more preferably 350-600 mV. In this range, the iron will remain in the ferric state. Further, the remaining base metals (e.g. nickel, cobalt and manganese) will remain in their divalent state. Accordingly, the Eh potential is preferably in this range at the end of the leaching step (i.e., the Eh of the leachate slurry 18). Alternately, the Eh may be maintained in the range during the leaching process.

If the Eh is too high, then the base metals will form higher oxidation compounds. For example, manganese will form permanganate. Accordingly, the Eh is preferably sufficiently low so that the non-ferrous base metals remain as metal chlorides. If the Eh is reduced below 700 mV, and preferably below 600 mV, at or towards then end of the leaching step, then some of the oxidized metal values will tend to revert to metal chlorides. However, some of the metal values may not revert back to metal chlorides. Accordingly, the Eh of the lixiviant is preferably below the upper end of the range at the end of the leaching step and, more preferably, the Eh of the lixiviant is maintained below the upper end of the range during all or essentially all of the leaching step so as to prevent the metal values oxidizing.

If the Eh is below about 300 mV, then the iron will convert to ferrous iron. Accordingly, the Eh is preferably maintained at a level sufficiently high to prevent iron converting to its ferrous state. It will be appreciated that while the Eh level may vary during the leaching step, provided the Eh is at the desired level in the leachate slurry 18, then the iron will precipitate as hematite and/or a magnetic iron oxide such as spinel.

If the Eh is maintained sufficiently high to maintain iron in its ferric state, then the iron will tend to immediately form hematite as it is leached thereby reducing the amount of chloride tied up in ferric chloride during the leach and reducing the amount of acid which may have to be added during the leaching step to maintain the desired composition of the lixiviant.

The operation of a metal recovery process will now be described based on the preferred embodiment shown in FIG. 1. A value metal-rich solution (leachate slurry 18) is obtained in the leach step. The residue (solids), which is in the form of a suspension in the leachate slurry 18, is preferably low in non-ferrous value metals e.g. low in nickel. Leachate slurry 18 may be treated by a variety of techniques to recover some or all of the metal values therein. In the preferred embodiment of FIG. 1, leachate 22 is subjected to sequential precipitation steps to first remove base metals such as copper, manganese, zinc and aluminum and to subsequently remove nickel and cobalt.

As shown in FIG. 1, leachate slurry 18 is fed to a solid/liquid separation step 20 to effect separation of the leachate from the solids present therein e.g. leach residue and crystalline mineral iron solids. Solid/liquid separation step 20 produces a value metal rich leachate stream 22 and a residue stream 24. Techniques for such separation are known e.g. using a pressure or vacuum filter, counter-current decantation or centrifuge. Any solid/liquid separation technique known in the art may be used. As shown in FIG. 1, a filtration step is used and water stream 26 is provided to wash entrained leachate from the solid residue.

Residue stream 24 may be discarded or may be treated to recover some or all of the metal values therein. In accordance with the leaching step disclosed herein, a substantial portion of the iron which is leached from the ore is hydrolyzed and precipitated as hematite and/or a magnetic iron oxide such as spinel. Accordingly, residue stream 24 may comprise a magnetic portion, which may be separated in a magnetic separator to produce a feed stream which may be useful for the production of ferro-nickel or low alloy steels and a treated residue stream. The treated residue stream may have a sufficiently small amount of value metals that the treated residue stream might be fed as waste to a tailings pond.

Value metal rich leachate stream 22 may be subjected to a purification step 34 in which value metals other than nickel and cobalt may be removed. In a preferred embodiment, value metal rich leachate stream 22 is treated to remove value metals other than nickel and cobalt. Accordingly stream 22 may be treated by ion exchange, solvent extraction, electrowinning or precipitation to remove these value metals. Preferably, stream 22 is treated by chemical addition to precipitate manganese, copper, aluminum and/or chromium that may be present and to retain nickel and cobalt in solution. For example, as shown in FIG. 1, value metal rich leachate stream 22 may be subjected to oxidation by the addition of an oxidant stream e.g. chlorine gas or hydrogen peroxide, and adjustment of the pH to the range of 3-6 to effect precipitation of iron and manganese, copper, aluminum and/or chromium, if present, in the leachate and obtain a treated leachate stream 40. The pH may be adjusted by various means, such as the addition of a pH adjustment agent via stream 38. The pH adjustment agent may be a base such as lime, caustic soda or magnesium oxide. In a particularly preferred embodiment, magnesium oxide is the pH adjustment agent. An advantage of the use of magnesium oxide is that the required amount of magnesium oxide may be produced by treating magnesium chloride in the spent lixiviant. Further, the addition of magnesium oxide does not add any additional ions in the leachate, which if added, may require the use of additional treatment steps. The oxidant is added to convert ferrous iron to ferric iron and to ensure the manganese is in its tetravalent state. If such metals are not present in the leachate, the oxidant need not be added.

Some or all of stream 40 may be subjected to any solid/liquid separation step 42 to produce a metal depleted leachate stream 44 and a residue stream 46. Preferably, residue stream 46 is recycled and fed to leaching step 16 to recover magnesium and co-precipitated or adsorbed value metals e.g. nickel and cobalt that may be present in residue stream 46. It will be appreciated that stream 40 may be treated by other known techniques to recover some or all of the value metals therein.

In an alternate embodiment, it will be appreciated that the precipitation which occurs in purification step 34 may be carried out in a series of steps to obtain different residues, each of which contains differing concentrations of value metals. For example, iron tends to precipitate out at a pH in the range 0.5-3, aluminum and chromium tend to precipitate out at a pH in the range 1.5-3.5 and manganese tends to precipitate out at a pH in the range 3-6. Accordingly, a residue stream containing high proportions of aluminum and chromium may be produced and a residue stream containing a high proportion of manganese may be produced.

Metal depleted leachate stream 44 may be subjected to further treatment steps in order to recover additional value metals. Stream 44 may be treated by ion exchange, solvent extraction, electrowinning or precipitation to remove these value metals. Preferably, stream 44 is treated by chemical addition to precipitate cobalt and nickel that may be present. For example, as shown in FIG. 1, metal reduced leachate stream 44 may be subjected to precipitation or adjustment of the pH to the range of 6-8.5, preferably 7.5-8.5, to effect precipitation of nickel and cobalt in the leachate and to obtain a treated leachate stream. The pH may be adjusted by various means, such as the addition of a pH adjustment agent via stream 50. The pH adjustment agent may be a base. In a particularly preferred embodiment, magnesium oxide is the pH adjustment agent. An advantage of the use of magnesium oxide is that the required amount of magnesium oxide may be produced by the process and the addition of magnesium oxide does not add any additional ions in the leachate, which may require the use of additional treatment steps.

As shown in FIG. 1, this separation is preferably carried out in two stages, with nickel and cobalt (if present) being recovered in relatively pure form e.g. in the form of the hydroxides, in first precipitation step 48 and the remaining value metals removed in a subsequent precipitation step 60.

The first stage precipitation 48 is preferably conducted at a pH in the range 6.5-7. The pH is preferably raised by the addition of magnesium oxide via stream 50 to produce a leachate 52 which is subjected to a solid liquid separations step 54 to obtain a residue 56 containing mixed nickel and cobalt hydroxides and a further metal depleted leachate 58.

Residue stream 56 may then be treated to recover nickel. The balance of the value metals may then be recovered from leachate 58 in precipitation step 60 using, preferably, excess magnesium oxide, which may be added via stream 62 (preferably in the pH range 7-8.5), to obtain a residue 64 containing residual value metals in the form of hydroxides and a spent lixiviant stream 66. Residue 64 may be recycled to the leaching step. Water may be added, if required during these steps.

Spent lixiviant stream 66 is a magnesium chloride solution. Some or all of spent stream 66 may be returned by recycle stream 68 as lixiviant for leach step 16. Depending upon the composition of the spent stream 66 and the amount of water added during the metal recovery steps subsequent to leach step 16, the lixiviant may need to be regenerated. Accordingly, some or all of spent stream 66, may be treated e.g. by partial evaporation in an evaporator 70 to produce a recycle stream 72 of magnesium chloride, addition of magnesium chloride and/or hydrochloric acid, and recycled to the leach step 16.

Magnesium oxide may be formed from the spent lixiviant stream 66 by subjecting the stream to, e.g., pyrohydrolysis step 74 to produce a hydrochloric acid stream 76 and a pure magnesium oxide stream 78 including caustic magnesia. Some or all of hydrochloric acid stream 76 may be recycled in the process (e.g. to leach step 16). Some or all of the magnesium oxide stream 78 may be used in the process (e.g. as a pH adjustment agent) and/or offered for sale.

Thus, in embodiments of the present invention e.g. as shown in FIG. 1, the present invention provides for the use of mixtures of magnesium chloride and hydrochloric acid in the leach step. The dissolution of iron into a solubilized chloride in the leachate may be controlled and minimized, without requiring expensive pre-treatment or post-treatment steps. The leach residue may be maintained in a form that is readily filterable by controlling the concentration and temperature during the leaching step. Water evaporation and hydrochloric acid regeneration requirements may be addressed, with only a portion of the magnesium chloride obtained requiring pyrohydrolysis.

In the process of the present invention, the Mg/HCl ratio in the leach step may be adjusted to reflect any specific requirements or characteristics of the process and ore fed to the process. For example, by adjusting the amount of spent lixiviant that is subjected to pyrohydrolysis, the amount of magnesium chloride and hydrochloric acid which are available for recycle to the leaching step may be adjusted. In some instances, all of the chloride ion in the leach solution may be supplied from the recycled lixiviant streams 68, 72.

Figure 2:
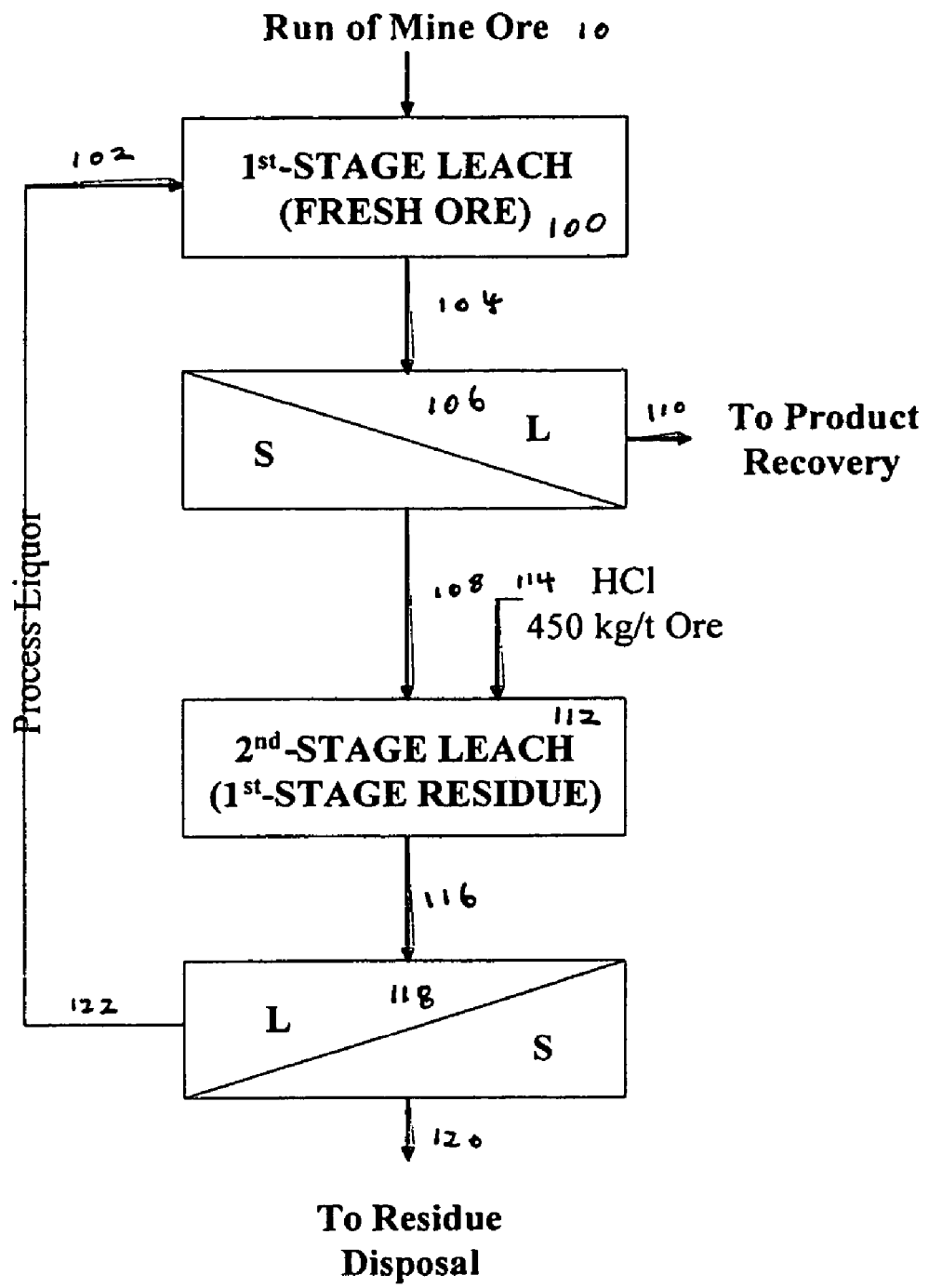

The leaching process may be conducted continuously in at least one stirred tank reactor. Preferably, at least two reactors are used, the first for addition of lateritic nickel ore and the second for control of the iron. For example, as shown in FIG. 2, a concentrate or ore stream 10 is fed to a first leaching step 100. Lixiviant is added via stream 102 to produce a first leachate stream 104, which is then subjected to a solid liquid separation step 106 to obtain a solid reduced leachate 110 and a residue 108. The solid reduced leachate 110 may then be treated to recover metal chlorides such as by the sequential precipitation steps of FIG. 1. The residue 108 is subjected to a second leaching step 112 to obtain a second leachate 116. Preferably additional acid is added via stream 114 to the second leaching step 112 to leach additional metal values from the ore. The second leachate 116 is then subjected to solid liquid separation step 118 to produce a solid residue 120 which may be treated to recover any value metals (e.g., hematite) and a second leachate 122, some or all of which may be recycled to the first leaching step 100 as lixiviant 102. The second leachate may be subjected to regeneration steps to produce the lixiviant for the first leaching step and/or additional leaching agents may be added separately to first leaching step 100. It will also be appreciated that three or more leaching reactors may be utilized.

Process control may be effected by the rates of addition of lateritic nickel ore and/or lixiviant to the process and/or the chemical composition of the lixiviant. For example, the pH may be adjusted by the addition of magnesium oxide and the Eh may be adjusted by the addition of an oxidant.

The leaching process may be conducted in any particular mode known in the art. The mode of leaching, e.g. batch, continuous co-current or continuous countercurrent, may be selected depending upon the particular nature of the ore being treated. The batch process takes place in a single reactor, and may be operated to a pre-determined endpoint based on the desired pH and Eh of the particular system within the parameters set forth in this invention. Co-current leaching is preferred for readily leachable ores (low iron content), whereas countercurrent is preferred for more difficult to leach ores (high iron content ores).

One embodiment of a process for the regeneration of lixiviant is that the spent leach solution (pure $MgCl_2$ solution) subsequent to separation of nickel and cobalt (described above) undergoes partial or pre-evaporation. The degree of partial or pre-evaporation may be reduced, or even eliminated, by feeding gaseous hydrogen chloride to the pure $MgCl_2$ solution, especially prior to the partial or pre-evaporation stage. The gaseous HCl may be from the off gases in the hydrolyzer. In this manner, energy required for evaporation of water is reduced or eliminated and an azeotrope of hydrochloric acid is obtained. The azeotrope may be recycled to the lixiviant solution, offered for sale or used in another manner.

The stream of "pure $MgCl_2$ solution" may be split and part undergoes pyrohydrolysis to form magnesium oxide. Off gases are fed to an HCl absorber and separator. A solution of HCl may be combined with the remainder of the split stream and is used as regenerated lixiviant. Alternately, some or all of the off gasses may be fed to the leaching step to enhance the level of hydrochloric acid and also to provide heat to the leaching reactor for the heat balance of the leaching step.

In another embodiment of the process for regeneration of lixiviant, off-gases from pyrohydrolysis are used to pre-evaporate concentrated $MgCl_2$ solution and enrich that solution in HCl. This recovers energy from the pyrohydrolysis step.

As discussed above, in an alternate preferred embodiment, the lixiviant comprises hydrochloric acid and a mixture of magnesium chloride and at least one additional metal chloride or cation. These additional cations are preferably obtained from the leach of the ore so that the lixiviant that is fed to the leach reactor substantially comprises, and preferably, consists essentially of magnesium. The additional metal chloride is at least one of sodium chloride, potassium chloride, calcium chloride, copper chloride and iron chloride. Copper chloride, especially cupric chloride, and iron chloride, especially ferric chloride, are preferred. If the cation is leached from the ore, then cation is selected from the group of cations in the aforementioned chlorides. The amount of additional metal chloride and cations may be from about 1-25 weight % of the amount of magnesium chloride, especially from about 5-15% of the magnesium chloride. These metal chlorides provide additional sources of chloride ions.

In another alternate preferred embodiment, the lixiviant may be comprised of hydrochloric acid, magnesium chloride and an oxidant, and optionally the additional metal chloride described above. Examples of the oxidant are air, oxygen, chlorine, hypochlorite, chlorite, chlorate and peroxides such as hydrogen peroxide. In the case of a gas, the gas may be dispersed by any means known in the art, such as a sparger. The amount of oxidant that is added may be varied over a wide range. Preferably the oxidant is added on an "on-demand" basis, and is primarily determined by practical considerations. In embodiments, the oxidant is preferably added to maintain the desired Eh (electric potential versus SHE (standard hydrogen electrode).

The leaching of lateritic nickel ore, and the recovery of value metal therefrom, using lixiviants containing additional metal chloride and/or oxidant may be conducted in the same manner as leaching with lixiviant comprising hydrochloric acid and magnesium chloride.

Preferred aspects of the present invention provide a leaching process that reduces or minimizes extraction of other metal values, especially iron and optionally magnesium, depending upon the cation concentration in the lixiviant. The iron remains in the leach residue, which may be subjected to magnetic separation for use in the production of ferronickel or low alloy stainless steel.

The process of the present invention does not require pre-treatment of the lateritic nickel ore to render the iron content relatively inert. The process does not result in high rates of build up of iron in the leachate due to the hydrolysis of the iron. External agents for control of iron and magnesium need not be required since any required agents ($MgCl_2$, MgO and HCl) may be products or recycled streams of the process. The leaching agent may be regenerated and recycled. Pure magnesia, especially caustic magnesia, may be produced.

A particular advantage of the process of the present invention is that high rates of extraction of value metals are obtained in a leaching step that operates at atmospheric pressure. The use of atmospheric pressure results in substantial economic advantages, especially in capital costs. Value metals may be recovered. The use of chloride chemistry offers advantages in operating and capital costs of the process. The leaching agent is regenerated and recycled, preferably by using a pyrohydrolysis step with additional hydrochloric acid being formed from chlorine if required. Magnesium chloride may be recycled to the leaching step.

The present invention is illustrated by the following examples.

EXAMPLE I

A series of laboratory experiments was carried out, wherein samples of 100 g of mixed saprolitic and limonitic ore from the Sechol deposit in Guatemala were treated. The mixed ore had the following analysis, the amounts being reported in wt %: nickel 2.25%; cobalt 0.03%; magnesium 14.4%; iron 15.2%; silicon 16.0%; calcium <0.05%; aluminum 0.9%; copper <0.05%; zinc <0.05% and chromium 0.53%. This ore also contained 20% of a refractory magnetite phase, which was not readily amenable to leaching. The samples were leached at 20% solids density for four hours at 100° C. in mixtures of magnesium chloride and hydrochloric acid, varying (i) the total chloride ion concentration, and (ii) the magnesium to acid ratio. Table 1 provides further details and the results obtained.

TABLE I

| Chloride Concentration | % Extraction | Initial HCl Concentration | | | | |
|---|---|---|---|---|---|---|
| | | 1N | 1.5N | 2N | 3N | 4N |
| 150 g/L | Mg/HCl ratio | | | 0.37 | 0.14 | |
| | Ni | | | 75.9 | 71.3 | |
| | Fe | | | 1.1 | 10.8 | |
| | Mg | | | 53.4 | 40.8 | |
| | pH | | | 0.89 | 0.47 | |
| | Eh | | | 581 | 619 | |
| 230 g/L | Mg/HCl ratio | 1.83 | 1.1 | 0.75 | 0.39 | 0.21 |
| | Ni | 60.5 | 69.7 | 81.2 | 88.1 | 93.1 |
| | Fe | 1.1 | 1.8 | 2.2 | 25.1 | 46.9 |
| | Mg | 20.9 | 34.7 | 52.1 | 66.2 | 83.4 |
| | pH | 2.27 | 0.427 | 0.363 | 0.353 | 0.299 |
| | Eh | 357 | 523 | 583 | 614 | 646 |
| 300 g/L | Mg/HCl ratio | 2.5 | 1.5 | 1.1 | 0.6 | |
| | Ni | 58.7 | 72.4 | 78.5 | 87.6 | |
| | Fe | 5.2 | 28.4 | 16.9 | 21 | |
| | Mg | 14.8 | 28.5 | 38.8 | 56.3 | |
| | pH | 0.743 | 0.465 | 0.518 | 0.581 | |
| | Eh | 488 | 563 | 562 | 544 | |

The results show effects of both total chloride ion concentration (i.e. the contribution from both the magnesium chloride and hydrochloric acid), as well as that of initial acid concentration. For this ore and under the conditions used, there was an optimum total chloride concentration around 230 g/L, above which iron dissolution was significant, and below which the nickel (and cobalt) extraction decreased. It should also be noted that in these examples 80% Ni extraction represents almost 100% recovery of nickel from the non-magnetic fraction of the ore due to the presence in the ore of the refractory material, which is not readily leachable. The solubility of iron in solution is also to be noted, as virtually all of the iron remained in the residue in 2N HCl solution. Both cobalt and nickel were leached from the lateritic nickel ore, and the cobalt recoveries were similar to those of nickel.

EXAMPLE II

An example of a counter-current leach test is shown in FIG. 4. Fresh ore was fed to a first leaching step, in which there was a lixiviant containing 360 g/L of magnesium chloride in hydrochloric acid, the hydrochloric acid being obtained from recycled lixiviant. The first leaching step was operated at 105° C. The pH was 0.38, the Eh was about 400 mV and the ratio of Mg/HCl on a mass basis was 0.84. The leach slurry obtained was fed to a solids/liquid separation step, from which liquor containing value metals was separated for further processing. The solids were fed to a second leaching step to which hydrochloric acid was fed at a rate of 450 kg/ton of solids. The lixiviant again contained 360 g/L of magnesium chloride. The second leach was conducted at 105° C. for 4 hours. The pH was in the range 0.68-0.72, the Eh was about 400 mV and the ratio of Mg/HCl on a mass basis was 0.91. A second solids/liquid separation step was conducted; the liquor, which contained 1.2 g/L of nickel and 0.024 g/L of cobalt, was recycled to the first leaching step, thereby recycling acid, magnesium chloride and leached value metals to the first leaching step. Nickel and cobalt were not precipitated in the second leaching step since nickel and cobalt will not precipitate at the operating pH. The overall nickel extraction was 84% and the overall cobalt extraction was 79%.

EXAMPLE III

A sample of a lateritic nickel ore with a relatively low iron content was subjected to leaching. The composition of the ore was as follows, the amounts being in wt %: Ni 2.3%, Co 0.03%, Mg 14.4%, Fe 15.2%, Si 16.0%, Ca <0.05%, Al 0.9%, Cu <0.05%, Zn <0.05%, Cr 0.5% and Mn 0.18%. The mesh size of the ore was −100. The leach time was 4 hours and the temperature was 95° C. The leach solutions had 20% solids.

Further process details and the results obtained are given in Table II. In Run 1, the lixiviant did not contain hydrochloric acid, and in Run 2 magnesium chloride was not added. Thus, Runs 1 and 2 are comparative runs.

TABLE II

| | Run No. | | | | |
|---|---|---|---|---|---|
| | 1 | 2 | 3 | 4 | 5 |
| Initial HCl concentration, N | — | 2.25 | 2.25 | 2.25 | 2.25 |
| Chloride conc. (g/L) | 120 | 79 | 200 | 230 | 250 |
| Mg/HCl (mass) | 1 | 0/1 | 0.5 | 0.62 | 0.7 |
| PH | 5.2 | 0.2 | <0 | <0 | <0 |
| Eh (mV) | 100 | 450 | 520 | 528 | 538 |
| Ore weight loss (%) | 2.4 | 35 | 46.5 | 44.4 | 42.7 |
| Ni concentration (g/L) | 0.04 | 2.2 | 3.54 | 4.5 | 4.42 |
| Fe concentration (g/L) | 0.83 | 4.5 | 5.8 | 9.8 | 9.8 |
| Ni extraction (%) | 0 | 44.0 | 85.9 | 87.0 | 86.5 |

The residue from Run 4 was analyzed, and contained 0.47% Ni, 0.017% Co, 8.95% Mg and 9.54% Fe. The results show that magnesium chloride on its own cannot effect the leaching of nickel, but that some hydrochloric acid is also necessary. The results also show that hydrochloric on its own is not as effective as the combined effect of the acid and magnesium chloride

EXAMPLE IV 200 gm of Sechol lateritic nickel ore from Guatemala, analyzing 1.72% Ni, 0.05% Co, 23.4% Fe, 0.37% Mn and 6.85% Mg, were leached co-currently for a period of four hours at 105° C. in a solution containing 360 g/L magnesium chloride (91.8 g/L Mg), at varying acid to ore ratios (kg 100% HCl per tonne of dry ore) as shown below in Table III. The Eh value for all runs was 400 mV.

TABLE III

| | Metal Extraction, Concentration | | | | | | | | |
|---|---|---|---|---|---|---|---|---|---|
| Test | Ni, % | Ni, g/L | Co % | Co, g/L | Fe, % | Fe, g/L | Mn, % | Mn, g/L | Mg, g/L |
| 200 kg/t | 58.5 | 2.65 | 53.7 | 0.06 | 15.9 | 10.3 | 77.6 | 0.75 | 75 |
| 300 kg/t | 67.8 | 2.95 | 61.4 | 0.07 | 26.9 | 23 | 80.5 | 0.82 | 80 |
| 450 kg/t | 76.6 | 3.13 | 65.0 | 0.08 | 37.1 | 30 | 85.0 | 0.8 | 78 |
| 600 kg/t | 89.2 | 3.10 | 72.6 | 0.06 | 72.2 | 42 | 89.9 | 0.75 | 75 |

As in Example I, it is shown that there is an optimum amount of acid to maximize nickel and cobalt extraction. These tests also demonstrate that using a high magnesium concentration in the leaching solution can prevent the dissolution of magnesium from the ore, since the starting concentration of magnesium in solution was 91.8 g/L. The high magnesium concentration, however, did not prevent the leaching of nickel and cobalt. It should be noted that these ores contained approximately 25% of a refractory magnetic fraction, of similar nickel and cobalt content to the bulk ore. The nickel extraction at 450 kg/t HCl therefore represents approximately 100% of the non-magnetic fraction.

EXAMPLE V

The final filtrates from the co-current leach tests shown in Table III, which had a pH value of between −0.2 and 0.5 (depending on the acid/ore ratio) were contacted with fresh mineral at 35% solids loading and reacted for 6 hours at 105° C. This is an example of countercurrent leaching. The terminal iron concentrations obtained varied from 0.4 to 0.9 g/L, analysis of the final filtrate showing the iron to be 100% ferrous ion. The resulting filtrates were then subjected a further similar leaching procedure, except that the slurry was reacted under oxidizing conditions. The iron concentration in the final filtrates were determined to be <1 mg/L.

This example shows that iron can be effectively re-precipitated during a countercurrent leach using the feed ore only, and does not require any addition of a reagent base, such as MgO, to ensure that it is removed from solution.

EXAMPLE VI

A magnesium chloride-brine containing 360 g/L $MgCl_2$ and 35 g/L $FeCl_3$ was prepared. Samples of equal volumes (150 mL) of the brine were then neutralized to a pH of 1.8-2.0 with the same amount of magnesium oxide, one sample being neutralized at 95° C. and the other sample being neutralized at 105° C. The resultant samples were then allowed to react for one hour, with the respective temperatures being maintained constant. The resultant slurries were then allowed to stand overnight.

The heights of the settled solids in the samples were 3.2 cm and 1.8 cm, respectively, for the temperatures of 95° C. and 105° C., indicating a 44% increase in settling rate at the higher temperature. In each case, the solids filtered rapidly on a vacuum filter, and the final iron in solution was shown to be <1 mg/L in both cases. This example demonstrates the beneficial effect of temperature on precipitation of iron from strong magnesium chloride brines in a solid/liquid separation procedures. Such a procedure may be used in separation of iron from magnesium chloride solutions in the process of the present invention.

The invention claimed is:

1. A process for treating a lateritic nickel ore containing at least one base metal oxide in which the lateritic nickel ore is leached at a pH less than 3 with a lixiviant comprising hydrochloric acid and at least one chloride salt containing cations having a higher hydration number than hydrogen to produce a leachate, the concentration of chloride ions is above about 4.5 moles of total chloride/liter of lixiviant and the molar ratio of cations having a higher hydration number than hydrogen to the amount of hydrochloric acid in the lixiviant is from about 0.15 to about 4.5.

2. The process as claimed in claim 1 wherein the cation is selected from the group consisting of alkali metals, alkaline earth metals, ferric iron, ferrous iron, cuprous copper, cupric copper and mixtures thereof.

3. The process as claimed in claim 1 wherein the cation is selected from the group consisting of sodium, calcium, potassium, lithium, magnesium, ferric iron, ferrous iron, cuprous copper, cupric copper and mixtures thereof.

4. The process as claimed in claim 1 wherein, prior to contacting the lateritic nickel ore, the cation consists essentially or magnesium.

5. The process as claimed in claim 1 wherein at the end of the leaching step, at least 25 weight % of the cation is magnesium.

6. The process as claimed in claim 1 wherein the concentration of chloride ions is from 4.5 to 14M.

7. The process as claimed in claim 1 wherein the concentration of chloride ions is from 6 to 12M.

8. The process as claimed in claim 1 wherein the molar ratio of cations in the lixiviant to the amount of HCl in the lixiviant is from about 0.3 to about 2.5.

9. The process as claimed in claim 1 wherein the lateritic nickel ore comprises more than 25 weight percent iron and the molar ratio of cations in the lixiviant to the amount of HCl in the lixiviant is from about 0.15 to about 3.

10. The process as claimed in claim 1 wherein the lateritic nickel ore comprises more than 25 weight percent iron and the molar ratio of cations in the lixiviant to the amount of HCl in the lixiviant is from about 1 to about 2.3.

11. The process as claimed in claim 1 wherein the lateritic nickel ore comprises less than 25 weight percent iron and the molar ratio of cations in the lixiviant to the amount of HCl in the lixiviant is from about 0.3 to about 2.

12. The process as claimed in claim 1 wherein the lateritic nickel ore comprises less than 25 weight percent iron and the molar ratio of cations in the lixiviant to the amount of HCl in the lixiviant is from about 0.15 to about 2.3.

13. The process as claimed in claim 1 wherein the lateritic nickel ore comprises an oxidic base metal ore.

14. The process of claim 1 in which the leach is carried out at a temperature in the range of from about 75° C. to the boiling point of the lixiviant.

15. The process of claim 1 in which the leach is carried out at a temperature in the range of from about 100° C. to the boiling point of the lixiviant.

16. The process of claim 1 wherein the process is conducted in an unpressurized vessel.

17. The process of claim 1 wherein the Eh is sufficiently low to maintain base metals in the lixiviant in a divalent state and sufficiently high to maintain iron as ferric iron.

18. The process of claim 1 wherein the Eh is in the range of 300 to 700 mV.

19. The process of claim 1 wherein the Eh is in the range of 350 to 600 mV.

20. The process of claim 1 wherein the pH of the lixiviant at the start of the leach is up to about 0.4, and the pH of the lixiviant increases during the leaching step to the range 0.4-2.5 to precipitate iron and maintain a nickel rich leachate, as measured by conventional instrumentation.

21. The process of claim 4 wherein the pH of the lixiviant at the start of the leach is up to about 0.5, and the pH of the lixiviant increases during the leaching step to the range 0.7-2.5 to precipitate iron and maintain a nickel rich leachate, as measured by conventional instrumentation.

22. The process of claim 20 wherein the leachate has solublized therein a first metal comprising at least one member selected from the group consisting of, copper, aluminum, zinc and chromium and a second metal comprising at least one member selected from the group consisting of nickel and cobalt and the process further comprises:

(a) separating a value metal-rich leachate from the lateritic nickel ore in a first solids/liquid separation;

(b) increasing the pH of the leachate to obtain a solid fraction containing at least a portion of the first metal and a first metal-depleted leachate, and separating the solid fraction from the first metal-depleted leachate in a second solids/liquid separation step;

(c) further increasing the pH of the first metal-depleted leachate to obtain a second metal depleted leachate and a solid fraction containing the second metal as a precipitated hydroxide, and separating the solid fraction containing the second metal from the second metal-depleted leachate in a third solids/liquid separation step.

23. The process of claim 22 wherein the leachate also has solublized therein at least one of iron and manganese and step (b) further comprises subjecting the value metal-rich leachate to oxidation.

24. The process of claim 22 wherein the leachate also has solublized therein iron and step (b) further comprises treating the value metal-rich leachate to convert ferrous iron to ferric iron.

25. The process of claim 22 wherein the leachate also has solublized therein manganese and step (b) further comprises treating the value metal-rich leachate such that the manganese is in its tetravalent state.

26. The process of claim 22 wherein the cation comprises magnesium and the second metal-depleted leachate is subjected to recycle steps for recovery of magnesium chloride and hydrochloric acid.

27. The process of claim 22 wherein, prior to contacting the lateritic nickel ore, the cation is magnesium and the second metal-depleted leachate is treated to produce a solution comprising magnesium chloride and hydrochloric acid that is used as the lixiviant.

28. The process of claim 27 wherein the treatment step of claim 27 also produces magnesium oxide.

29. The process of claim 28 wherein at least some of the magnesium oxide is used as a pH adjustment agent in at least one of steps (b) and (c).

30. The process of claim 29 in which treatment step includes partial evaporation and hydrolysis.

31. The process of claim 1 in which the lixiviant comprises hydrochloric acid, magnesium chloride and at least one member selected from the group consisting of (i) at least one additional metal chloride which is added to the lixiviant prior to the lixiviant contacting the lateritic nickel ore; (ii) at least one additional cation which is leached from the lateritic nickel ore and (iii) an oxidant.

32. The process of claim 22 in which additional metal chloride or an additional cation is present.

33. The process of claim 32 in which the additional metal chloride is at least one member selected from the group consisting of sodium chloride, potassium chloride, calcium chloride, copper chloride and iron chloride.

34. The process of claim 33 in which the amount of additional metal chloride and cation is 1-25 wt. % of the amount of magnesium chloride.

35. The process of claim 31 in which an oxidant is present.

36. The process of claim 35 in which the oxidant is at least one member selected from the group consisting of air, oxygen, chlorine, hypochlorite, chlorite, chlorate, perchlorate, permanganate and peroxide.

37. The process of claim 31 in which additional metal chloride and oxidant are present.

38. The process of claim 37 in which the additional metal chloride is at least one member selected from the group consisting of sodium chloride, potassium chloride, calcium chloride, copper chloride and iron chloride and an oxidant is at least one member selected from the group consisting of air, oxygen, chlorine, hypochlorite, chlorite, chlorate and hydrogen peroxide.

39. The process of claim 32 in which at least a portion of one of the first metal-depleted leachate and the second metal-depleted leachate is treated to regenerate the lixiviant by admixing a magnesium chloride solution with gaseous hydrogen chloride.

40. The process of claim 39 in which the portion of one of the first metal-depleted leachate and the second metal-depleted leachate is subjected to distillation for separation of azeotropic hydrochloric acid.

41. The process of claim 40 in which the gaseous hydrogen chloride is admixed with the portion of one of the first metal-depleted leachate and the second metal-depleted leachate to increase the amount of hydrochloric acid separated as azeotropic hydrochloric acid.

42. The process of claim 1 wherein the lateritic nickel ore is obtained from limonite and saprolite horizons.

43. A process for treating a lateritic nickel ore containing at least one base metal oxide comprising exposing the lateritic nickel ore to a lixiviant having a pH less than about 0.5 to produce a leachate, the lixiviant comprising hydrochloric acid and at least one chloride salt containing cations having a higher hydration number than hydrogen, the concentration of chloride ions and cations in the lixiviant is selected to leach ferric iron from the material and to hydrolyze leached iron to hematite and/or a magnetic iron oxide towards the end of the leach by increasing the pH.

44. The process as claimed in claim 43 wherein the leachate contains residual amounts of iron chloride.

45. The process as claimed in claim 43 wherein an amount of magnesium is leached from the lateritic nickel ore and the cation comprises magnesium and the process further comprises adjusting the concentration of magnesium in the lixiviant to control the amount of magnesium leached from the lateritic nickel ore.

46. The process as claimed in claim 43 wherein the cation comprises magnesium and the process further comprises adjusting the concentration of magnesium in the lixiviant that is contacted with the lateritic nickel ore so as to minimize magnesium being leached from the lateritic nickel ore.

47. The process as claimed in claim 43 wherein the concentration of cations having a higher hydration number than hydrogen is selected to reduce the activity of water in the lixiviant.

48. The process of claim 43 wherein the lateritic nickel ore is exposed to the lixiviant without being subjected to a roasting step.

49. The process of claim 44 wherein, prior to contacting the lateritic nickel ore, the lixiviant consists essentially of magnesium chloride and hydrochloric acid.

50. The process of claim 43 wherein the lateritic nickel ore is obtained from limonite and saprolite horizons.

51. The process of claim 43 further comprising subjecting the leachate to a first solid/liquid separation step after the pH is increased.

52. A process for treating a lateritic nickel ore containing at least one base metal oxide comprising exposing the lateritic nickel ore to a lixiviant having a pH less than about 0.5 to produce a leachate, the lixiviant comprising hydrochloric acid and at least one chloride salt containing cations having a higher hydration number than hydrogen, and adjusting the Eh of the lixiviant at the end of the leaching step such that the Eh is sufficiently low to maintain base metals in the lixiviant in a divalent state and the Eh, pH and temperature are sufficiently high and the amount of free water is sufficiently low to precipitate iron as hematite and/or a magnetic iron oxide form.

53. The process of claim 52 wherein the Eh is sufficiently high such that iron chloride that forms during the leach is precipitated as hematite and/or magnetic iron oxide by appropriately adjusting the pH during leaching.

54. The process of claim 52 wherein the Eh is maintained in the range generally throughout the leaching step.

55. The process of claim 52 wherein the Eh is in the range of 350 to 600 mV.

56. The process of claim 52 wherein the pH of the lixiviant at the start of the leach is up to about 0.4, and the pH of the lixiviant increases during the leaching step to the range 0.4-2.5 to precipitate iron, as measured by conventional instrumentation.

57. The process of claim 52 wherein the pH of the lixiviant at the start of the leach is up to about 0.5, and the pH of the lixiviant increases during the leaching step to the range 0.7-2.5 to precipitate iron, as measured by conventional instrumentation.

58. The process as claimed in claim 52 wherein the lateritic nickel ore comprises magnesium and, prior to exposing the lixiviant to the lateritic nickel ore, the cation is magnesium and the process further comprises adjusting the concentration of magnesium in the lixiviant that is contacted with the lateritic nickel ore so as to essentially prevent magnesium being leached from the lateritic nickel ore.

59. The process as claimed in claim 52 wherein the concentration of cations having a higher hydration number than hydrogen is selected to reduce the activity of water in the lixiviant.

60. The process of claim 52 wherein the lateritic nickel ore is exposed to the lixiviant without being subjected to a roasting step.

61. The process of claim 52 wherein, prior to exposing the lixiviant to the lateritic nickel ore, the lixiviant consists essentially of magnesium chloride and hydrochloric acid.

62. The process of claim 52 wherein the material is obtained from limonite and saprolite horizons.

63. A process for leaching a value metal from a lateritic nickel ore containing a first metal comprising at least one member selected from the group consisting of copper, iron, manganese, aluminum, zinc and chromium and a second metal comprising at least one member selected from the group consisting of nickel and cobalt, the process comprising:
(a) contacting the ore with a lixiviant comprising magnesium chloride and hydrochloric acid to produce a value metal-rich leachate and a leaching residue and increasing the pH of the metal-rich leachate to precipitate iron;
(b) separating the value metal-rich leachate from the leaching residue wherein the leaching residue includes precipitated iron;
(c) increasing the pH of the leachate to obtain a first metal-rich solid fraction and a second metal-rich leachate and separating the first metal-rich solid fraction from the second metal-rich leachate;
(d) increasing the pH of the second metal-rich leachate to obtain a second metal-poor leachate and a second metal-rich solid fraction containing the second metal.

64. The process of claim 63 further comprising adjusting the pH of the value-metal rich leachate to precipitate iron as hematite and/or a magnetic iron oxide.

65. The process of claim 64 wherein the leachate also has solublized therein at least one member selected from the group consisting of iron and manganese and step (c) further comprises subjecting the value metal-rich leachate to oxidation.

66. The process of claim 64 wherein the leachate also has solublized therein iron and step (c) further comprises treating the value metal-rich leachate to convert ferrous iron to ferric iron.

67. The process of claim 64 wherein the leachate also has solublized therein manganese and step (c) further comprises treating the value metal-rich leachate such that the manganese is in its tetravalent state.

68. The process of claim 64 wherein the cation comprises magnesium and the second metal-poor leachate is subjected to recycle steps for recovery of magnesium oxide and hydrochloric acid.

69. The process of claim 64 wherein, prior to contacting the material, the cation is magnesium and the second metal-poor leachate is treated to produce a solution comprising magnesium chloride and hydrochloric acid that is used as the lixiviant.

70. The process of claim 69 wherein the treatment step of claim 68 also produces magnesium oxide.

71. The process of claim 70 wherein at least some of the magnesium oxide is used as a pH adjustment agent in at least one of steps (c) and (d).

72. The process of claim 71 in which the treatment step includes partial evaporation and hydrolysis.

73. The process of claim 63 in which the lixiviant further comprises at least one member selected from the group consisting of (i) at least one additional metal chloride which is added to the lixiviant prior to the lixiviant contacting the material; (ii) at least one additional cation which is leached from the material and (iii) an oxidant.

74. The process of claim 73 in which additional metal chloride or an additional cation is present.

75. The process of claim 74 in which the metal of the additional metal chloride and the additional cation is at least one member selected from the group consisting of sodium chloride, potassium chloride, calcium chloride, copper chloride and iron chloride.

76. The process of claim 74 in which the amount of additional metal chloride and additional cation is 1-25 wt. % of the amount of magnesium chloride.

77. The process of claim 74 in which the amount of additional metal chloride results from the leaching of the ore.

78. The process of claim 73 in which an oxidant is present.

79. The process of claim 78 in which the oxidant is at least one member selected from the group consisting of air, oxygen, chlorine, hypochlorite, chlorite, chlorate, perchlorate, permanganate and peroxide.

80. The process of claim 73 in which additional metal chloride and oxidant are present.

81. The process of claim 80 in which the metal of the additional metal chloride and the additional cation is at least one member selected from the group consisting of sodium chloride, potassium chloride, calcium chloride, copper chloride and iron chloride and an oxidant is at least one member selected from the group consisting of air, oxygen, chlorine, hypochlorite, chlorite, chlorate and hydrogen peroxide.

82. The process of claim 81 in which the amount of additional metal chloride results from the leaching of the ore.

83. The process of claim 63 wherein the lixiviant has a pH less than about 0.5 and the process further comprises adjusting the pH of the value-metal rich leachate during the leach to above 0.5 to precipitate iron.

* * * * *